March 29, 1927.

S. B. SCHENCK

CONTROL APPARATUS

Filed Oct. 11, 1923

1,622,677

WITNESSES:
R. S. Harrison
C. W. Shaw.

INVENTOR
Samuel B. Schenck
BY
Wesley G. Carr
ATTORNEY

Patented Mar. 29, 1927.

1,622,677

UNITED STATES PATENT OFFICE.

SAMUEL B. SCHENCK, OF WILKINSBURG, PENNSYLVANIA, ASSIGNOR TO WESTING-
HOUSE ELECTRIC & MANUFACTURING COMPANY, A CORPORATION OF PENNSYL-
VANIA.

CONTROL APPARATUS.

Application filed October 11, 1923. Serial No. 667,925.

My invention relates to control systems and it has special relation to the control of certain auxiliary devices in conjunction with the operation of a vehicle.

An object of my invention is to provide a system of the above-mentioned character, in which a signalling device and a door-actuating mechanism are automatically operated when the weight of the load carried by the vehicle assumes a predetermined value.

Another object of my invention is to provide a system of the above-mentioned character, in which a predetermined time interval elapses between the operation of the signalling device and the operation of the door-actuating mechanism.

A further object of my invention is to provide a system of the above-mentioned character, in which the signalling device and the door-actuating mechanism are operated, when the weight of the load carried by the vehicle assumes a predetermined value, irrespective of the distribution of the load in the vehicle.

These and other objects of my invention will become apparent from the following detailed description, taken in conjunction with the accompanying drawing, in which—

Figure 1:
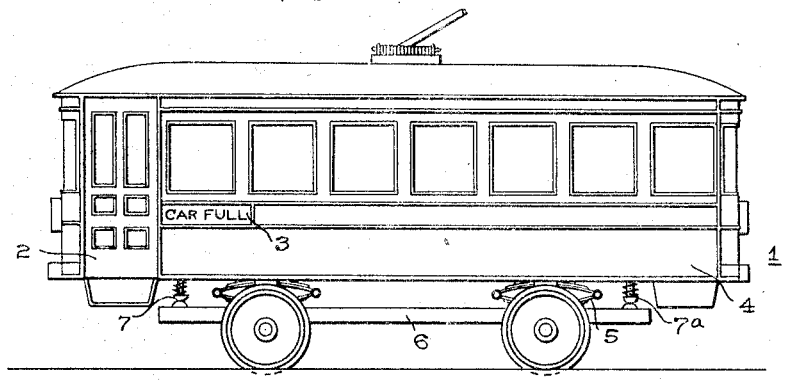
Figure 1 is a view in elevation of a vehicle equipped with my invention.
Figure 3:
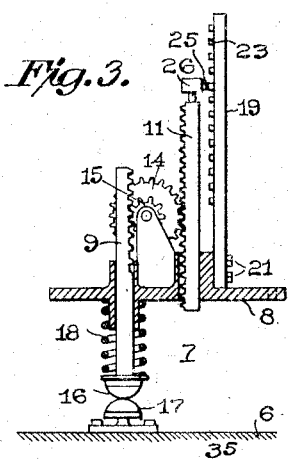
Fig. 3 is a view, partly in section and partly in side elevation, of a portion of the apparatus shown in Fig. 2.
Figure 5:
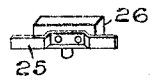
Fig. 5 is a view in perspective of a detail of the apparatus shown in Figs. 3 and 4.
Figure 4:
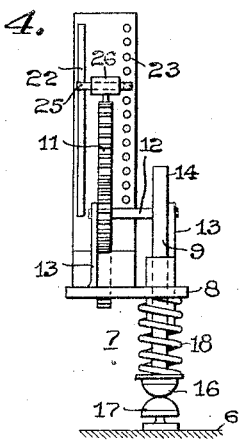
Fig. 4 is a view in front elevation of the apparatus shown in Fig. 3.

Referring to the drawing, the structure here shown comprises a vehicle 1, such as a trolley car, having a suitable door 2 and a signalling device 3. The body 4 of the vehicle 1 may be mounted in the usual manner, by means of a plurality of springs 5, upon a truck frame 6. A plurality of integrating devices 7 and 7a, are interposed between the body 4 of the vehicle and the truck frame 6, at opposite ends of the vehicle, for a purpose to be hereinafter set forth.

The integrating devices 7 and 7a each comprise a guide bracket 8, which may be secured in any well known manner to the floor of the vehicle body 4. A plurality of rack members 9 and 11 are slidably mounted in the guide bracket 8 and are adapted for relative vertical movement with respect to each other. A shaft 12 is horizontally mounted in a pair of supports 13, which are secured to the guide bracket 8. A plurality of gear-wheels 14 and 15 are secured to opposite ends of the shaft 12 and are adapted to mesh with the rack members 11 and 9 respectively. A buffer member 16 is secured to the lower end of the rack member 9, and cooperates with a second buffer member 17, which is secured to the truck frame 6. A helical spring member 18 is interposed between the buffer 16 and the guide bracket 8. A rheostat panel 19 is secured in any manner, such as by bolts 21, to the guide bracket 8. A continuous strip of conducting material 22 is mounted upon one side of the panel 19. A plurality of studs 23 of conducting material are disposed in spaced relation on the same side of the panel 19. The studs 23 are connected to a resistor 24 at equal intervals throughout its length. A rheostat arm 25 of conducting material is mounted by means of an insulating block 26 to the upper end of the rack member 11.

The arm 25 slidably engages the strip 22 and is adapted to bridge the strip 22 and various of the studs 23, according to the position of the rack member 11.

Figure 2:
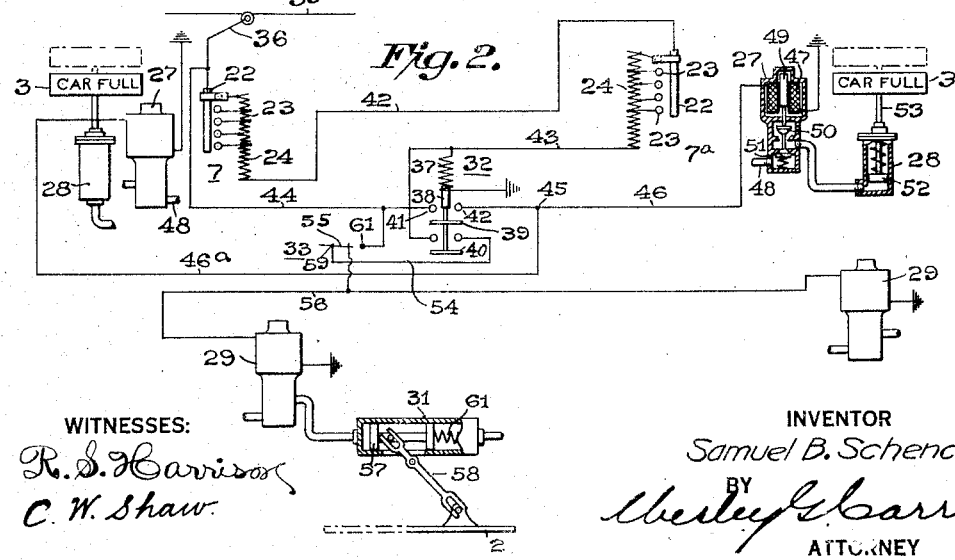
Fig. 2 is a diagrammatic view of a control system according to the present invention.

Referring to Fig. 2, a plurality of fluid pressure devices 28 and 31 are controlled, respectively, by a plurality of magnet valves 27 and 29. The operating coils of the magnet valves 27 and 29 are controlled by a relay 32.

The operation of my control system is as follows: When the vehicle 1 stops to receive passengers, for example, at a loading station or platform, the door 2 is opened by the operator. As the passengers enter the vehicle, the combined weight of the passengers tends to lower the floor of the vehicle and depress the spring members 18 of the integrating devices 7. Since the rack member 9 remains stationary, by reason of the buffer member 16 being always in engagement with the buffer member 17, which is secured to the truck frame 6, the gear-wheel 15, which meshes with the rack member 9, will be rotated upon the downward movement of the guide bracket 8, which is secured to the floor of the vehicle. Since both of the gear-wheels 14 and 15 are secured to the shaft 12, upon rotation of the gear-wheel 15, the gear-wheel 14, which meshes with the rack member 11, will move the rack member 11 in a downward direction through the guide bracket 8. The gear-wheel 14 is preferably of greater diameter than the gear wheel 15 so that relatively slight movement of the guide-bracket 8 with respect to the truck frame 6 will cause a correspondingly large movement of the rack member 11 in a vertical direction.

A circuit is thereupon established from the trolley conductor circuit 35 through trolley-pole 36, the conducting strip 22 of one of the integrating devices 7 and 7a, rheostat arm 25, one of the studs 23, a corresponding portion of resistor 24, conductor 42, strip 22, rheostat arm 25, a stud 23, and a portion of resistor 24 of the other integrating device, conductor 43, and the operating coil 37 of the relay 32, to ground.

The coil 37 of the relay 32 is wound to actuate the core member 38 of the relay at a predetermined voltage. As the number of passengers who have entered the vehicle increases, the rack member 11 is actuated still further. The rheostat arm 25 that is secured to each rack member 11, thus tends to cut out certain portions of the corresponding resistor 24 to thereby raise the voltage impressed upon the operating coil 37 of the relay device 32. When the predetermined voltage for which the operating coil 37 is set, is reached, corresponding to the maximum desired number of passengers, the core 38 is actuated.

A circuit is then established from trolley conductor 35, through trolley-pole 36, conductor 44 and bridging member 39 of the relay 32 to junction-point 45, where the circuit is divided. A portion of the current traverses conductors 46 and 46a, respectively, and each of the operating coils 47 of the magnet valves 27 to ground. The magnet valves 27, which are of a well-known type, are connected through pipes 48 to any convenient fluid pressure supply. When the coils 47 of the magnet valves 27 are energized, a core member 49 of each valve is actuated to close a valve member 50 and open a valve member 51. The fluid under pressure is thus admitted to the cylinder of each fluid-pressure device 28 and the corresponding piston 52 is forced in an upward direction. The signaling device 3, which is secured to piston 52 by a rod 53, is thus forced upwardly to register with an opening that is provided at one end of the vehicle and assumes the position illustrated in Fig. 1.

At the same time, another circuit is established from trolley conductor 35 through a portion of resistor 24 of the integrating device 7, conductor 42, a portion of resistor 24 of the integrating device 7a, conductor 43, movable contact member 40 of the relay 32, conductor 54, blade 55 of knife switch 33, which normally occupies the illustrated closed position, conductor 56, and the operating coil of the magnet valve 29, to ground. Since portions of the resistor 24 are always in circuit with the operating coils of the magnet valve 29, while the operating coils of the magnet valves 27 are energized by the full line voltage, there is a certain time element between the operation of the magnet valves 27 and the magnet valve 29. Upon energization of the operating coil of the magnet valve 29, fluid under pressure is admitted to the cylinder of the fluid-pressure device 31 and piston 57 is actuated. The door which is connected to the piston 57, in any well-known manner, such as by a pivoted arm 58, is thus actuated to its closed position.

Since the integrating devices are placed at opposite ends of the vehicle and the respective resistors are connected in series relation, the total amount of resistance in circuit with the relay 32 is therefore always the same for a given load regardless of the distribution of the load in the vehicle.

The door 2 may be opened at any time by disengaging the blade 55 of the switch 33 from the contact member or switch jaw 59. The circuit through the magnet valve 29 is thus interrupted. Upon deenergization of the coil of the magnet valve 29, a spring member 61 will actuate the piston 57 of the fluid-pressure device 31 and the lever 58 to actuate the door 2 to its open position. If the weight of the passengers entering the car, at any one of the car stops, is not sufficient to actuate the mechanism automatically, the operator may close the door by actuating the blade 55 of the switch 33 into engagement with another contact member 61. The coil of the magnet valve 29 is then energized directly from the line and the door will close.

It will be seen that I have provided a simple and efficient device for displaying a signal and closing the door of a vehicle upon the placing of a predetermined weight in the vehicle. An advantage of my device is that the operator of the vehicle is enabled to collect fares and issue transfers, or the like, without having to pay attention to the operating of the door mechanism. Another advantage is that in case the passengers group themselves around the entrance of the car, thus preventing the operator from observing whether the car is fully loaded, the door will not close. The operator may then request the passengers in the car to clear a space to enable sufficient people to enter the car to provide a full load.

I do not wish to be restricted to the specific circuit connections and arrangements of parts herein set forth, as it is evident that various modifications thereof may be made within the spirit and scope of my invention. I desire, therefore, that only such limitations shall be imposed as are indicated in the appended claims.

I claim as my invention:

1. A control system for vehicles comprising a warning signal, a door, and means, operable upon a predetermined weight being placed in said vehicle for operating said signal and for closing said door.

2. A control system for vehicles comprising a warning signal, a door, means, operable upon a load of predetermined weight being placed in said vehicle for operating said signal, and means for closing said door at a predetermined time interval after the operation of said signal.

3. A control system for vehicles comprising a warning signal, a door, a plurality of rheostats adapted to be actuated in accordance with the weight of the load carried by said vehicle, and means, controlled by said rheostats for operating said signal and for closing said door, upon the weight of said load assuming a certain predetermined value.

4. A control system for vehicles comprising a warning signal, a door, and means for operating said warning signal and closing said door, operable upon a load of predetermined weight being placed in said vehicle irrespective of the distribution of said load in said vehicle.

5. A control system for vehicles comprising a warning signal, a door, means for operating said warning signal and closing said door, and means, comprising an integrating device, for controlling said first-mentioned means in accordance with the weight of the load carried by said vehicle.

6. A control system for vehicles comprising a warning signal, a door, means for operating said warning signal and said door, a plurality of rheostats for controlling said means, and a plurality of integrating devices for actuating said rheostats in accordance with the weight of the load carried by said vehicle.

7. In a control system for vehicles, in combination, a vehicle door, means for actuating the vehicle door, means adapted to effect automatically the operation of said actuating means to close the door when the load in the vehicle reaches a predetermined weight, and manual means to effect the operation of said door actuating means to open the door.

8. In a control system for vehicles the combination with a door and means for operating said door of an integrating device for controlling said operating means in accordance with the weight of the load carried by said vehicle.

9. In a control system for vehicles, in combination, a vehicle door, means automatically operable to actuate the door when the load in the vehicle reaches a predetermined weight, and means cooperative with the door actuating means to signal that the vehicle is loaded.

10. In a control system for vehicles, in combination, a vehicle door, means automatically operable to actuate the door when the load in the vehicle reaches a predetermined weight, and means cooperative with the door actuating means to signal that the vehicle is loaded, said signalling means being adapted to function before the door is actuated.

11. In a control system for vehicles, in combination, a vehicle door, means automatically operable to actuate said door when the load in the vehicle reaches a predetermined weight, and means adapted for manual operation to effect the actuation of the vehicle door.

12. In a control system for vehicles, in combination, a vehicle door, means for actuating the door, means disposed for automatic operation when the load in the vehicle reaches a predetermined weight to set the door actuating means in operation, and means controlled by said automatic means to signal that the vehicle is loaded.

13. In a control system for vehicles, in combination, a vehicle door, means for actuating the door, means disposed for automatic operation when the load in the vehicle reaches a predetermined weight to set the door actuating means in operation, and means controlled by said automatic means to signal that the vehicle is loaded, said signalling means being adapted to function before the door actuating means.

14. In a control system for vehicles, in combination, a vehicle door, means for actuating the door, means disposed for automatic operation when the load in the vehicle reaches a predetermined weight to set the door actuating means in operation, means controlled by said automatic means to signal the loading of the vehicle, and means adapted for manual operation to control independently the door actuating means.

15. In a control system for vehicles, in combination, a vehicle door, means responsive to electric energy to signal when the load in the vehicle has reached a predetermined weight, means responsive to electric energy for actuating the door, a source of electric energy, circuits for energizing said signalling means and door actuating means, a relay for controlling said circuits, an actuating circuit for the relay, said relay being adapted to operate upon the flow of predetermined current, a variable resistance connected in the relay circuit, means for reducing the resistance as the load in the vehicle increases to permit the increase of current in the relay circuit, said relay being disposed to connect the resistance into the circuit of said door actuating means to effect a delayed action of the latter.

16. In a control system for vehicles, in combination, a vehicle door, means responsive to electric energy to signal when the load in the vehicle has reached a predetermined weight, means responsive to electric energy for actuating the door, a source of electric energy, circuits for energizing said signalling means and door actuating means, a relay for controlling said circuits, an actuating circuit for the relay, said relay being adapted to operate upon the flow of predetermined current, a variable resistance connected in the relay circuit, means for reducing the resistance as the load in the vehicle increases to permit the increase of current in the relay circuit, said relay being disposed to connect the resistance into the circuit of said door actuating means to effect a delayed action of the latter, and means adapted for manual operation to control independently said door actuating means.

In testimony whereof, I have hereunto subscribed my name this 4th day of October, 1923.

SAMUEL B. SCHENCK.